US009988886B2

(12) United States Patent
Salihbegovic

(10) Patent No.: US 9,988,886 B2
(45) Date of Patent: *Jun. 5, 2018

(54) GAS LIFT VALVE WITH MIXED BELLOWS AND FLOATING CONSTANT VOLUME FLUID CHAMBER

(71) Applicant: Weatherford Technology Holdings, LLC, Houston, TX (US)

(72) Inventor: Zlatko Salihbegovic, New Iberia, LA (US)

(73) Assignee: Weatherford Technology Holdings, LLC, Houston, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/432,573

(22) Filed: Feb. 14, 2017

(65) Prior Publication Data

US 2017/0152733 A1 Jun. 1, 2017

Related U.S. Application Data

(63) Continuation of application No. 14/021,326, filed on Sep. 9, 2013, now Pat. No. 9,605,521.

(60) Provisional application No. 61/701,220, filed on Sep. 14, 2012.

(51) Int. Cl.
*E21B 43/12* (2006.01)
*E21B 34/14* (2006.01)
*E21B 34/10* (2006.01)
*F16K 41/10* (2006.01)

(52) U.S. Cl.
CPC ............ *E21B 43/123* (2013.01); *E21B 34/10* (2013.01); *E21B 34/14* (2013.01); *F16K 41/10* (2013.01)

(58) Field of Classification Search
CPC ........ E21B 43/123; E21B 34/10; E21B 34/14; F16K 41/10
See application file for complete search history.

(56) References Cited

U.S. PATENT DOCUMENTS

| 2,680,408 | A | 6/1954 | Davis |
| 2,880,620 | A | 4/1959 | Bredtschneider |
| 4,151,857 | A | 5/1979 | DeMoss et al. |
| 5,662,335 | A | 9/1997 | Larsen |
| 6,827,146 | B2 | 12/2004 | Faustinelli |

(Continued)

FOREIGN PATENT DOCUMENTS

| EP | 2167788 B1 | 8/2011 |
| WO | 2011002817 A1 | 1/2011 |
| WO | 2011102732 A2 | 8/2011 |

OTHER PUBLICATIONS

Takacs, G., "3.2 Pressure-operated Gas Lift Valves," Excerpt from Gas Lift Manual, Tulsa, OK, PennWell Corp., 2005, pp. 180-183.

*Primary Examiner* — Michael R Wills, III
(74) *Attorney, Agent, or Firm* — Patterson & Sheridan, L.L.P.

(57) ABSTRACT

A valve apparatus capable of withstanding high pressures and techniques for using this apparatus in various suitable applications are provided. The valve apparatus typically includes both an upper bellows comprising a standard, convoluted bellows and a lower bellows comprising an edge-welded bellows. The valve apparatus may also include a floating, constant volume fluid chamber that travels with the lower edge-welded bellows as the lower bellows compresses and expands in an effort to protect the lower bellows from very high internal volume fluid pressure.

20 Claims, 9 Drawing Sheets

(56) References Cited

U.S. PATENT DOCUMENTS

| | | |
|---|---|---|
| 2004/0011411 A1 | 1/2004 | Thordarson et al. |
| 2004/0182437 A1 | 9/2004 | Messick |
| 2010/0096142 A1 | 4/2010 | Randazzo |
| 2010/0155079 A1 | 6/2010 | Stokka et al. |
| 2011/0067879 A1 | 3/2011 | Kleppa et al. |
| 2012/0125621 A1 | 5/2012 | Stokka et al. |
| 2012/0204977 A1 | 8/2012 | Lembcke |
| 2013/0032226 A1 | 2/2013 | Salihbegovic |
| 2013/0312833 A1 | 11/2013 | Salihbegovic |
| 2014/0069659 A1 | 3/2014 | Wang et al. |

GAS LIFT VALVE WITH MIXED BELLOWS AND FLOATING CONSTANT VOLUME FLUID CHAMBER

CLAIM OF PRIORITY UNDER 35 U.S.C. 119

This application is a continuation of U.S. patent application Ser. No. 14/021,326, filed Sep. 9, 2013 and entitled "Gas Lift Valve with Mixed Bellows and Floating Constant Volume Fluid Chamber," which claims benefit of U.S. Provisional Patent Application No. 61/701,220, filed Sep. 14, 2012 and sharing the same title, both of which are herein incorporated by reference in their entireties.

BACKGROUND

Field

Embodiments of the present disclosure generally relate to valves capable of withstanding high pressures, including valves for use in hydrocarbon wells configured for artificial lift operations, for example.

Description of the Related Art

To obtain hydrocarbon fluids from an earth formation, a wellbore is drilled into the earth to intersect an area of interest within a formation. The wellbore may then be "completed" by inserting casing within the wellbore and setting the casing therein using cement, for example. In the alternative, the wellbore may remain uncased (an "open hole" wellbore), or may be only partially cased. Regardless of the form of the wellbore, production tubing is typically run into the wellbore primarily to convey production fluid (e.g., hydrocarbon fluid, as well as water and other, non-hydrocarbon gases) from the area of interest within the wellbore to the surface of the wellbore.

Often, pressure within the wellbore is insufficient to cause the production fluid to rise naturally through the production tubing to the surface of the wellbore. Thus, to force the production fluid from the area of interest within the wellbore to the surface, artificial lift means are sometimes employed. Gas lift and steam injection are examples of artificial lift means for increasing production of oil and gas from a wellbore.

Gas lift systems are often the preferred artificial lifting systems because operation of gas lift systems involves fewer moving parts than operation of other types of artificial lift systems, such as sucker rod lift systems. Moreover, because no sucker rod is required to operate the gas lift system, gas lift systems are usable in offshore wells having subsurface safety valves that would interfere with a sucker rod.

Gas lift systems commonly incorporate one or more valves in side pocket mandrels of the production tubing to enable the lifting of production fluid to the surface. Ideally, the gas lift valves allow gas from the annulus between the casing and production tubing to enter the tubing through the valves, but prevent reverse flow of production fluid from the tubing to the annulus.

SUMMARY

Embodiments of the present disclosure generally relate to a valve apparatus having two different bellows types and a floating constant volume fluid chamber in which one of the bellows travels. In this manner, the valve apparatus is capable of withstanding extremely high pressures (e.g., at least 10,000 psi).

One embodiment of the present invention is a valve for controlling fluid flow between an inlet and an outlet. The valve generally includes one or more components forming a housing for the valve, a first bellows coupled to the housing, and a second bellows coupled to the housing, wherein the second bellows is a different bellows type than the first bellows.

Another embodiment of the present invention is a method for performing downhole gas lift operations. The method generally includes providing a valve and opening the valve. The valve generally includes one or more components forming a housing having an inlet and an outlet for fluid flow; a seating element disposed in the housing, wherein an orifice in the seating element permits fluid flow between the inlet and the outlet; a stem configured to move in the housing, wherein a sealing element associated with the stem is configured to engage the orifice to prevent the fluid flow between the inlet and the outlet, thereby closing the valve; a first bellows coupled to the housing and to the stem; and a second bellows coupled to the housing and to a movable piston of a variable volume chamber in the housing, wherein the second bellows is a different bellows type than the first bellows. Opening the valve generally involves injecting gas downhole, wherein an injected gas pressure is greater than a dome gas pressure in the variable volume chamber, such that the stem moves away from the seating element to allow the fluid flow between the inlet and the outlet via the orifice.

Yet another embodiment of the present invention is a system for downhole gas lift operations. The system generally includes casing disposed in a wellbore; production tubing disposed in the casing; and at least one valve. The at least one valve generally includes one or more components forming a housing having an inlet and an outlet for fluid flow, wherein the fluid flow enters the inlet from an annulus between the casing and the production tubing and exits the outlet into the production tubing; a first bellows coupled to the housing; and a second bellows coupled to the housing, wherein the second bellows is a different bellows type than the first bellows. For some embodiments, the at least one valve is disposed in a side pocket mandrel of the production tubing.

BRIEF DESCRIPTION OF THE DRAWINGS

So that the manner in which the above recited features of the present disclosure can be understood in detail, a more particular description of the various aspects, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure provide a valve apparatus capable of withstanding high pressures and techniques for using the valve apparatus in various suitable applications. The valve apparatus typically includes both an upper bellows comprising a standard, convoluted bellows and a lower bellows comprising an edge-welded bellows. The valve apparatus may also include a floating, constant volume fluid chamber that travels with the lower edge-welded bellows as the lower bellows compresses and expands in an effort to protect the lower bellows from very high internal volume fluid pressure.

Figure 1:
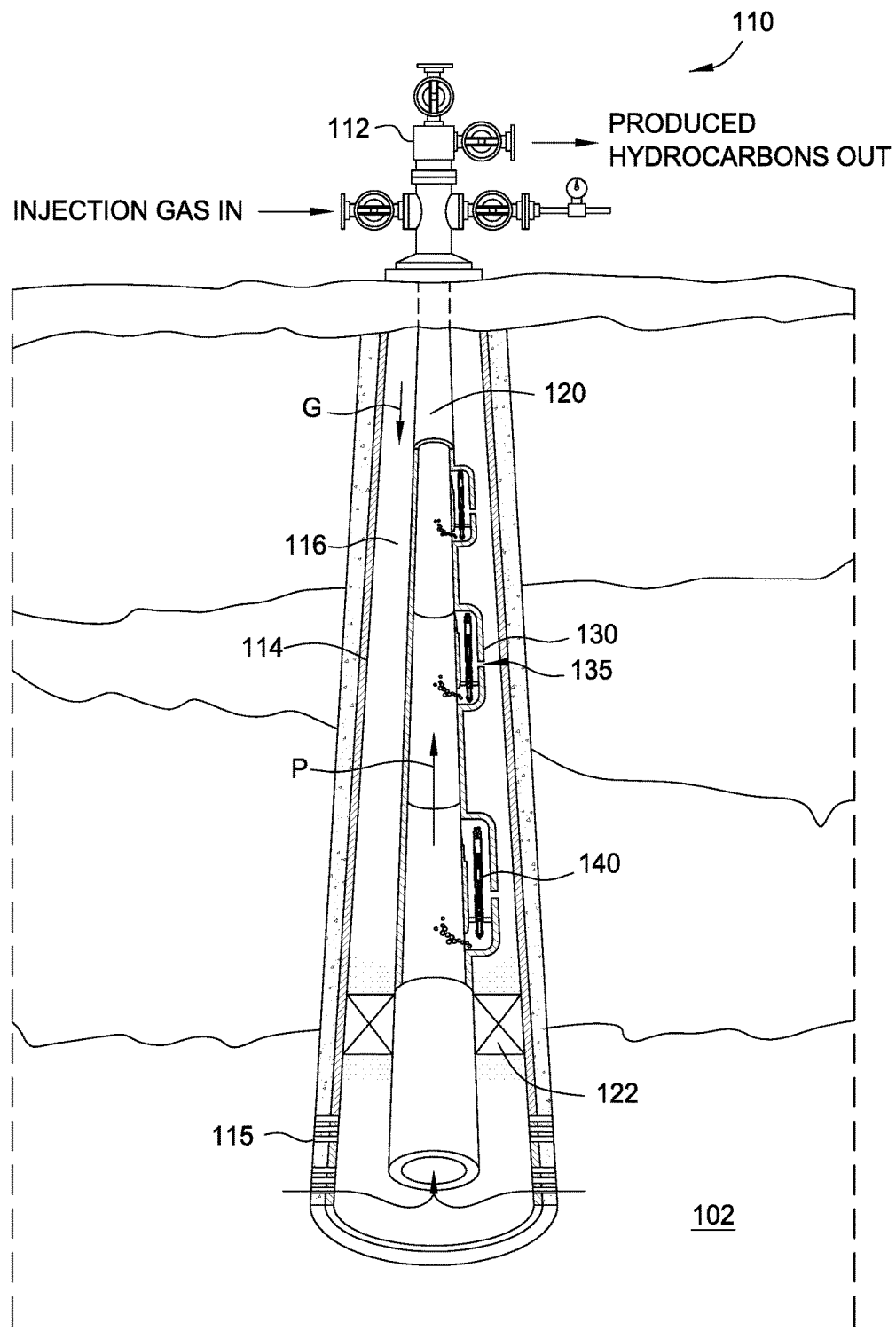
FIG. 1 is a cross-sectional view of a gas injection wellbore, in accordance with an embodiment of the present disclosure.

FIG. 1 illustrates a typical gas lift completion for hydrocarbon recovery, which may include a wellhead 112 atop a casing 114 that passes through a formation 102. Production tubing 120 positioned in the casing 114 may have a number of side pocket mandrels 130 and a production packer 122. To conduct a gas lift operation, operators conventionally install gas lift valves 140 in the side pocket mandrels 130.

With the valves 140 installed, compressed gas G from the wellhead 112 may be injected into the annulus 116 between the production tubing 120 and the casing 114. In the side pocket mandrels 130, the gas lift valves 140 then act as one-way valves by opening in the presence of high-pressure injection gas, thereby allowing the gas to flow from the annulus 116 to the tubing 120. When pressure is reduced as a result of discontinued pumping of gas at the surface, the valve 140 closes to prevent reverse production fluid flow from the tubing 120 to the annulus 116.

Downhole, the production packer 122 forces upwards travel through the production tubing 120 of production fluid P entering casing perforations 115 from the formation 102. Additionally, the packer 122 keeps the gas flow in the annulus 116 from entering the tubing 120.

The injected gas G passes down the annulus 116 until it reaches the side pocket mandrels 130. Entering the mandrel's inlet ports 135, the gas G first passes through the gas lift valve 140 before it can pass into the production tubing 120. Once in the tubing 120, the gas G can then rise to the surface, lifting production fluid P in the production tubing in the process.

Figure 2:
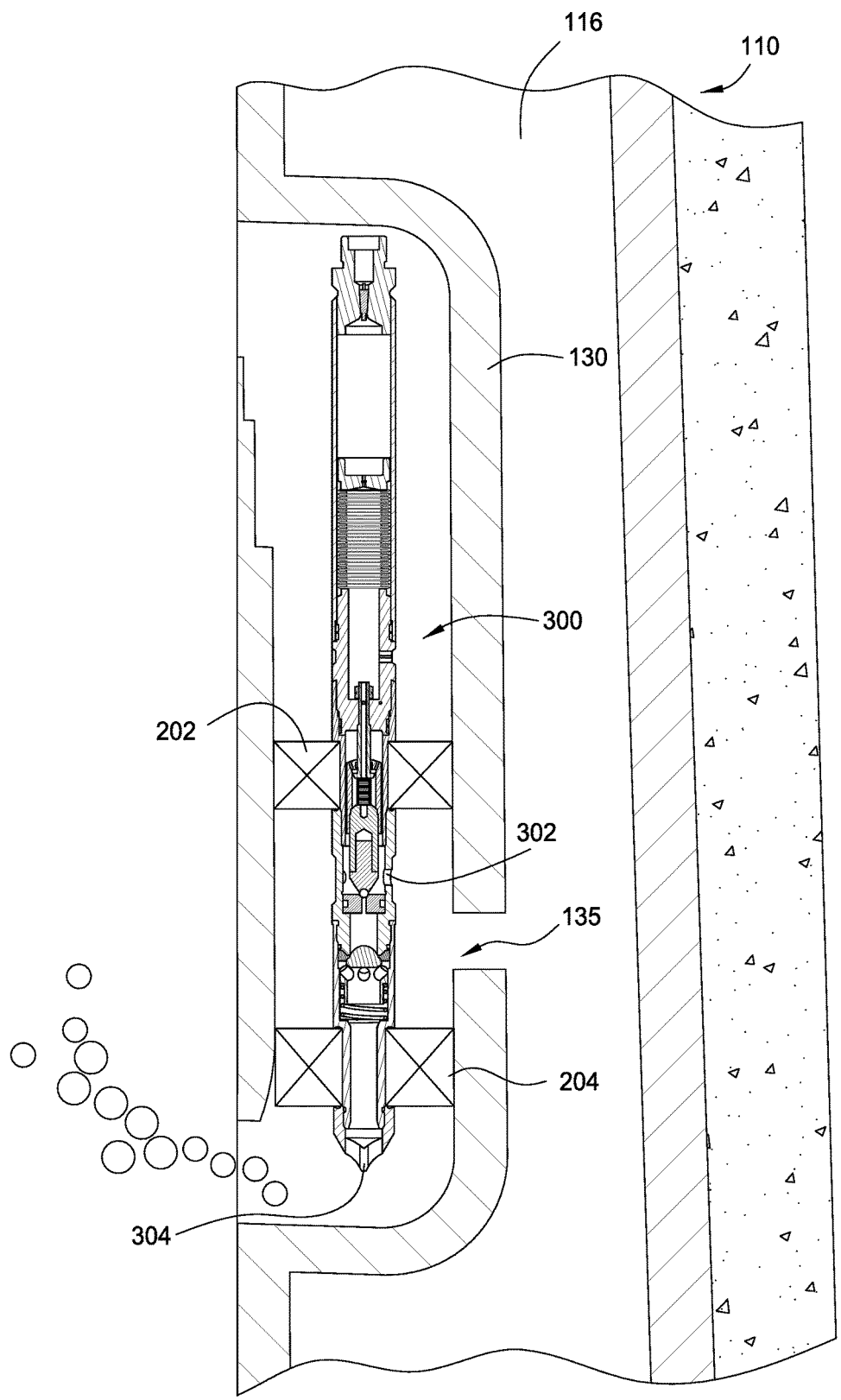
FIG. 2 is a cross-sectional view of a side pocket mandrel incorporating a gas lift valve, in accordance with an embodiment of the present disclosure.

FIG. 2 depicts an example disposition of a gas lift valve (e.g., valve apparatus 300 of the present disclosure) in a side pocket mandrel 130. As depicted, one or more entrance ports 302 (i.e., inlets) of the gas lift valve may be placed adjacent a mandrel port 135 such that pressurized injection gas may enter the valve from the annulus 116 and flow through the valve into the production tubing 120 via an exit port 304 (i.e., an outlet). Packing seals 202, 204 may be used between the gas lift valve and the walls of the side pocket mandrel 130 on either side of the entrance port 302 and the mandrel port 135 to control the flow of injection gas.

There is demand in the hydrocarbon recovery industry for gas lift valves for high gas pressure applications. Existing gas lift valves usually work up to 2500 psi injection pressure, but desired operating pressures range up to 10,000 psi and beyond. Currently there is no valve on the market that can work at such high pressures. Accordingly, what is needed is a valve apparatus for withstanding such high pressures.

The problem with current gas lift valves may be attributed to a seal that separates the valve dome's nitrogen pressure and the injection gas pressure. This seal is typically a bellows that may have a standard convoluted or edge-welded configuration. Single or multiple bellows may be used for this purpose and may be arranged in different configurations. The bellows may be surrounded or filled with non-compressible fluid (e.g., silicone oil) to prevent the bellows from damage caused by over-compression by gas. However, a gas lift valve bellows is not pressure balanced until exposed to injection pressure that usually acts on the bellows' external surface, whereas the dome pressure acts on the bellows' internal surface. This principle can be inverted, as well, such that the dome pressure acts on the bellows' external surface and the injection pressure acts inside the bellows.

The bellows assembly may be arranged, for example, as described in U.S. Pat. Nos. 2,880,620 and 5,662,335, in which two appropriately connected bellows of different diameters are used to maintain a constant volume of a non-compressible compressible fluid that prevents bellows damage. U.S. Pat. No. 2,880,620 describes standard convoluted bellows, while U.S. Pat. No. 5,662,335 describes two edge-welded bellows. The volume between the valve housing and the bellows' outer diameter (OD) is filled with a constant volume of non-compressible fluid. When injection fluid is applied to the volume between the valve's inner diameter (ID) and the bellows' outside surface, the bellows exposed to high production/injection fluid pressure cannot be damaged since the differential pressure across the bellows is working against the non-compressible fluid inside the bellows (see, e.g., FIG. 4 in U.S. Pat. No. 5,662,335).

This principle will work as long as the dimensional difference between bellows elements, such as the bellows elements' thickness, can withstand the differential pressure. Once the weakest bellows element yields and is exposed to the differential pressure, the bellows will fail. To visualize this, imagine a thin balloon-like container having a uniform wall thickness filled with water and uniformly exposed to external pressure. Theoretically, external gas pressure can be infinitely high since the pressure is working against non-compressible water. However, the wall thickness is never perfectly uniform, and at a certain gas pressure, the thinnest section of the wall will yield. The same principle pertains to bellows elements, which will eventually yield due to this principle of non-uniform element thickness.

The main advantage of edge-welded bellows in this principle is not utilized: edge-welded bellows can be completely compressed to a solid state by external pressure in an effort to prevent bellows deformation and failure. When fully compressed, edge-welded bellows elements are butted against each other and mating parts to which the individual bellows elements are welded; hence, deformation cannot take place. Full compression prevents the edge-welded bellows from yielding. As of the time embodiments of the present disclosure were conceived, a gas lift valve utilizing fully compressed edge-welded bellows did not exist on the market.

Furthermore, there is currently no bellows application where non-compressible fluid is applied to both the internal and external bellows surfaces to prevent the bellows from damage. Embodiments of the present disclosure take advantage of the recognition that when the bellows is either compressing or expanding, fluid inside and outside the bellows may have constant volume in order to accept the pressure load: if pressure is applied from outside of the bellows, internally trapped fluid will prevent the bellows from collapsing and if pressure is applied from inside the bellows, externally trapped fluid will prevent the bellows from bursting.

Figure 3:
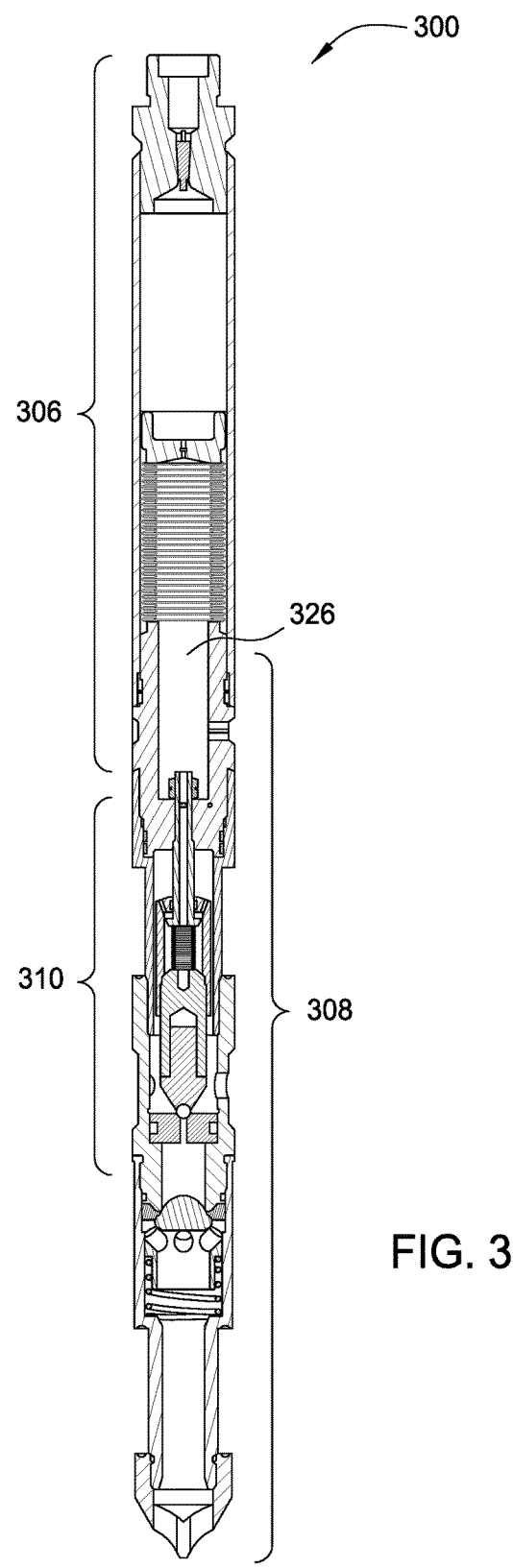
FIG. 3 is a cross-sectional view of a valve apparatus, in accordance with an embodiment of the present disclosure.
Figure 4A:
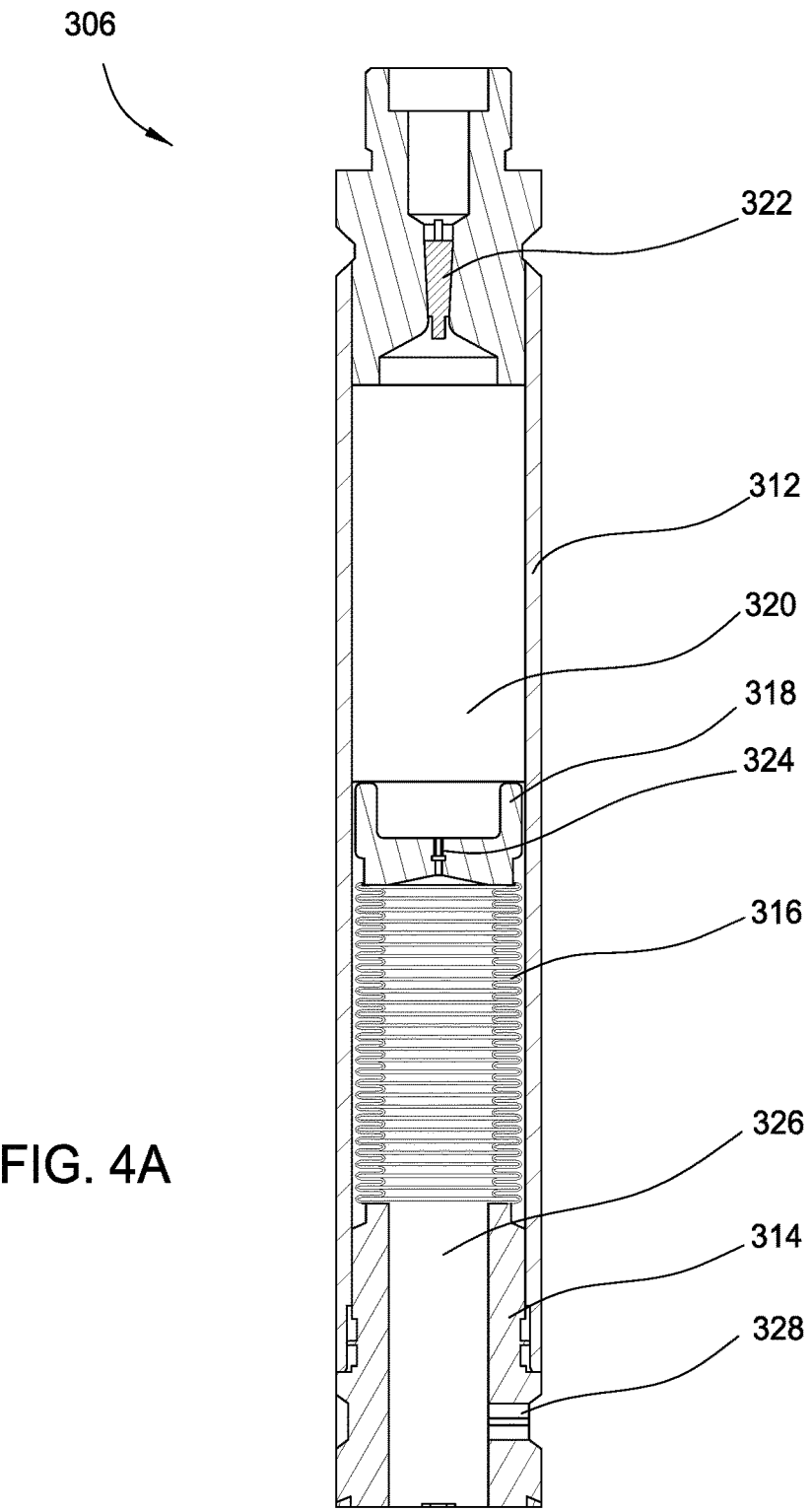
FIG. 4A is a cross-sectional view of an upper portion of the valve apparatus in FIG. 3, zoomed in to show a pressurized dome and upper, convoluted bellows when the valve apparatus is closed, in accordance with an embodiment of the present disclosure.
Figure 4B:
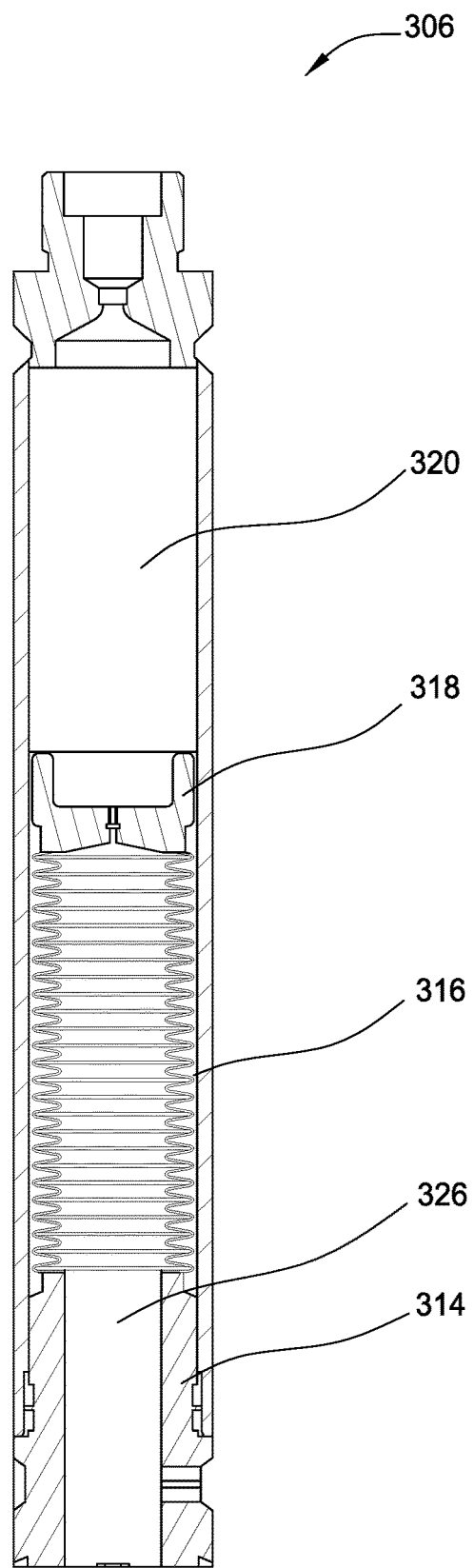
FIG. 4B is a cross-sectional view of the upper portion of the valve apparatus in FIG. 3, when the valve apparatus is open, in accordance with an embodiment of the present disclosure.
Figure 5:
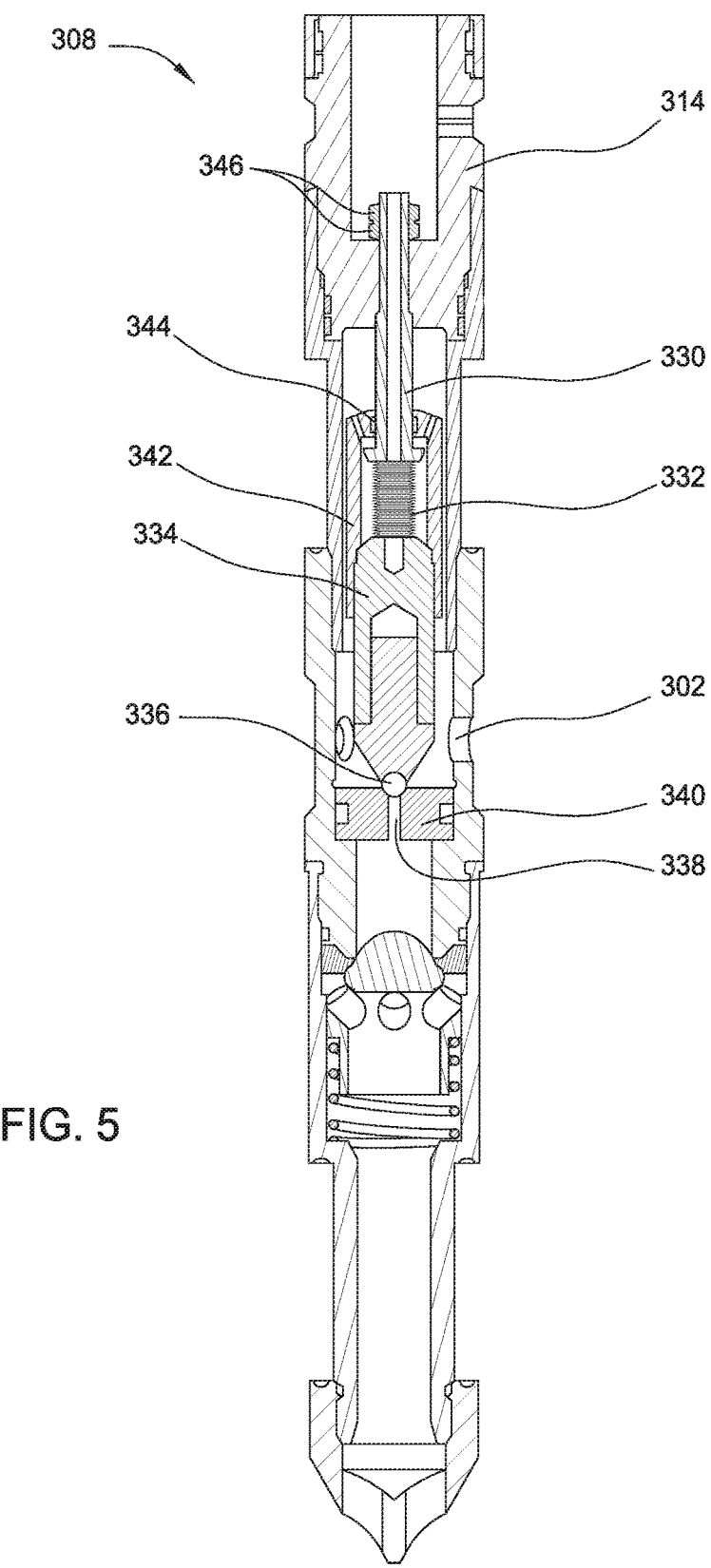
FIG. 5 is a cross-sectional view of a lower portion of the valve apparatus in FIG. 3, in accordance with an embodiment of the present disclosure.
Figure 6A:
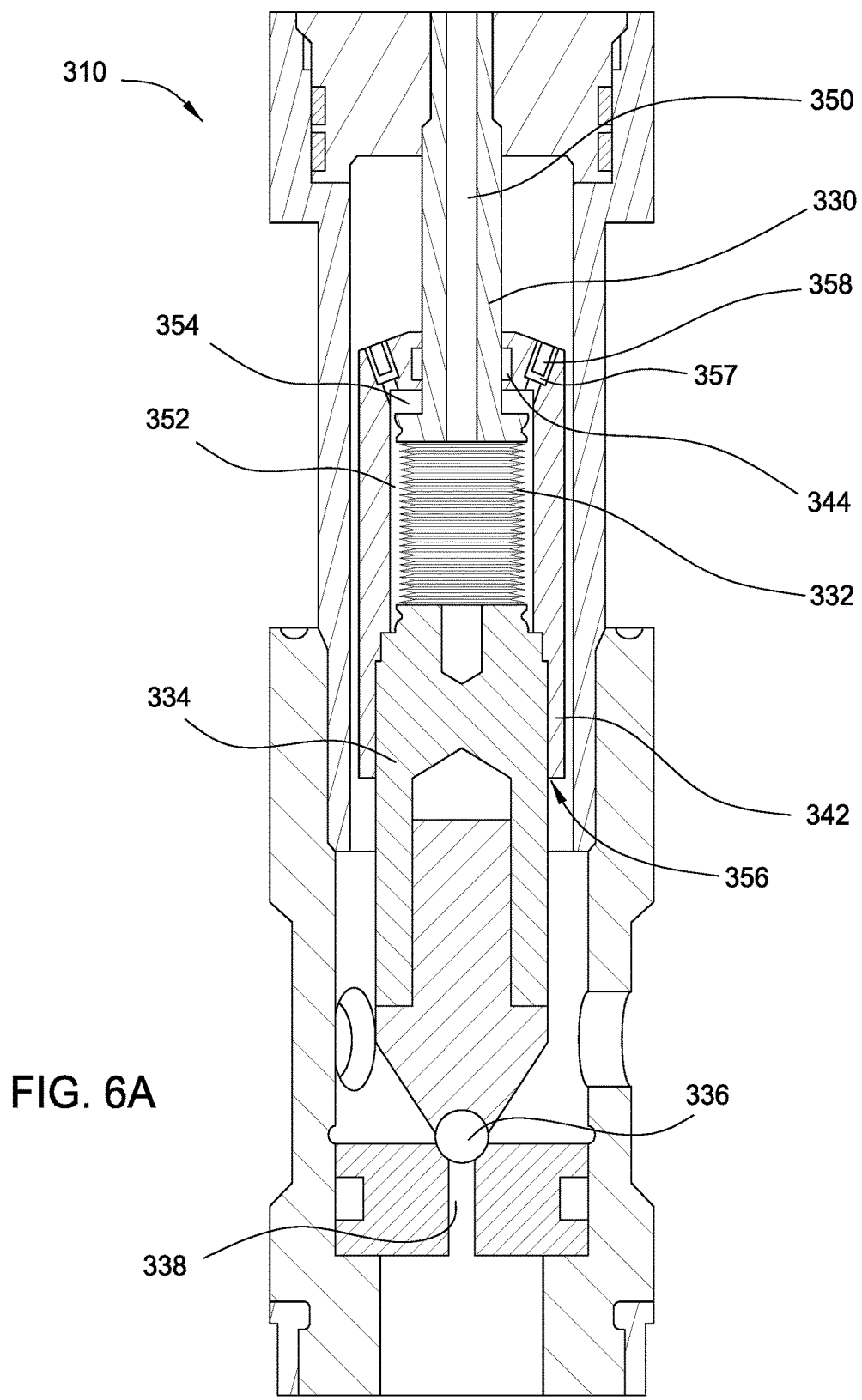
FIG. 6A is a cross-sectional view of the valve apparatus in FIG. 3, zoomed in to show a shaft, a sliding cylinder, and lower, edge-welded bellows when the valve apparatus is closed, in accordance with an embodiment of the present disclosure.
Figure 6B:
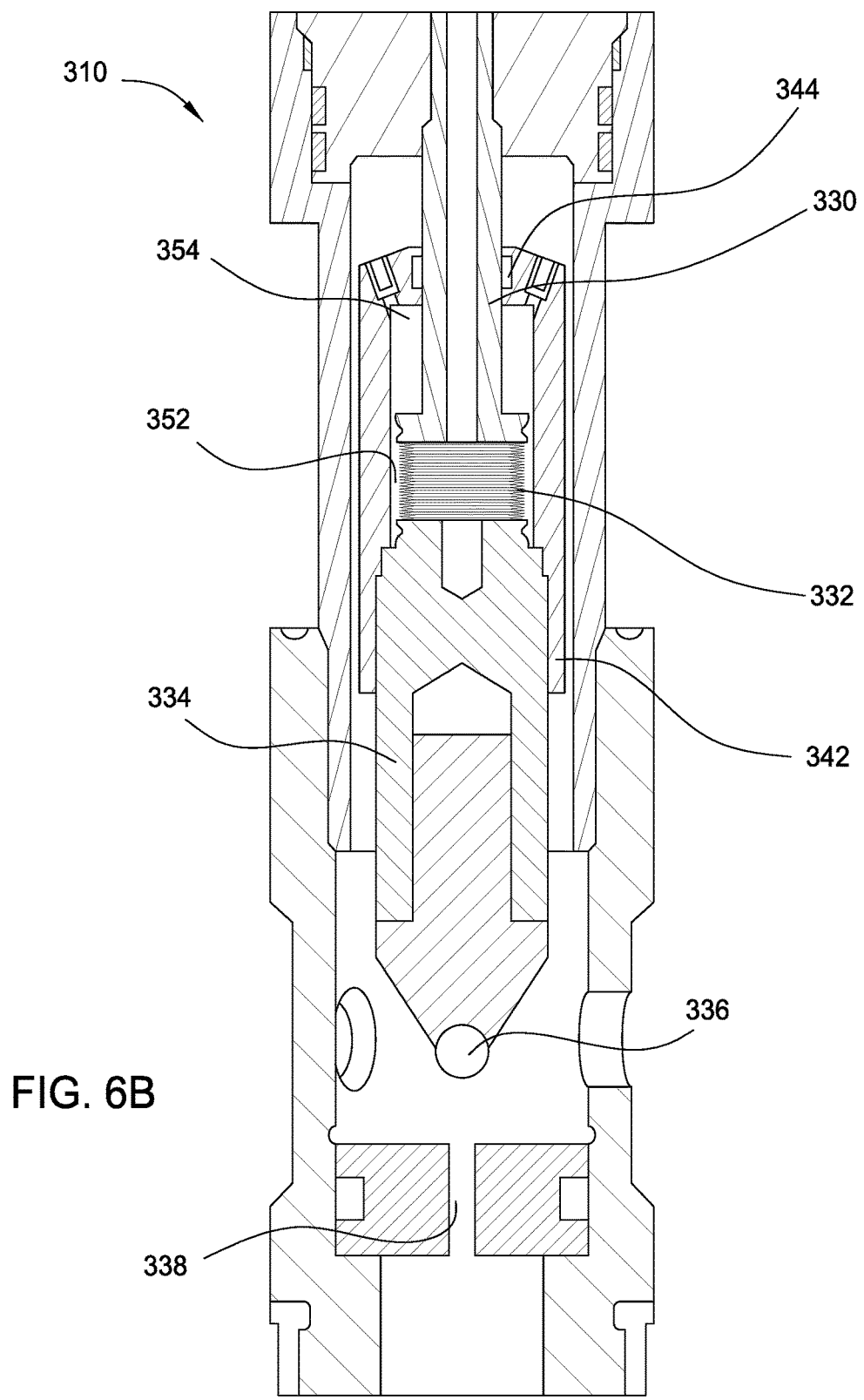
FIG. 6B is a cross-sectional view of the valve apparatus in FIG. 3, zoomed in to show the shaft, the sliding cylinder, and the lower, edge-welded bellows when the valve apparatus is open, in accordance with an embodiment of the present disclosure.

In order to achieve this, embodiments of the present disclosure use two different types of bellows (e.g., one standard convoluted bellows and one edge-welded bellows). For the description that follows, FIG. 3 is a cross-sectional view of a valve 300, in accordance with an embodiment of the present disclosure. FIGS. 4A and 4B illustrate an upper portion 306 of the valve 300, whereas FIG. 5 illustrates a lower portion 308 of the valve. FIGS. 6A and 6B illustrate a fraction 310 of the lower portion 308 of the valve 300, zoomed in to show the movable components.

As illustrated in FIG. 4A, the upper bellows 316 (which may be a standard convoluted bellows) may be mechanically coupled (e.g., welded) to a central adapter 314 at one end. The other end of the upper bellows 316 may be welded (or suitably coupled in another manner) to a piston 318. The upper bellows 316 is referred to as the "upper" bellows since gas lift valves are usually installed in a vertical position, and this bellows 316 is in the upper portion 306 of the valve 300 when installed. The upper bellows 316 is installed inside a valve body 312, which may be charged with a suitable gas, such as nitrogen, to a predetermined pressure. This gas may enter the dome volume 320 through drill core valve 322. Using a standard convoluted bellows for the upper bellows 316 (as compared to edge-welded bellows, for example) may allow much lower dome pressure, thereby providing increased upper bellows performance and lower overall stress level and enhancing the life expectancy and cycle number of the bellows.

As illustrated in FIG. 5, the lower bellows 332 (which may be an edge-welded bellows (EWB)) may be mechanically coupled (e.g., welded) to a hollow shaft 330 at one end, and the other end of the bellows 332 may be welded (or suitably coupled in another manner) to a stem 334. A sliding cylinder 342 may be installed over the shaft 330 with a (pre-installed) seal 344 (e.g., an O-ring). The sliding cylinder 342 may be threaded for coupling with the stem 334, and/or the stem 334 may be welded to the sliding cylinder at welding points 356 for some embodiments. Non-compressible fluid (e.g., silicone oil) may be added to volume 352 through ports 357, where volume 352 is the volume outside the lower bellows' outer diameter (OD) and the inner diameter (ID) of the sliding cylinder 342, as illustrated in FIG. 6A. All remaining air may most likely be completely evacuated from volume 352. Once the non-compressible fluid has filled the volume 352, plugs 358 may be installed in the ports 357.

At this point, the lower bellows 332 is stretched to its free length (i.e., uncompressed). With this design, the lower bellows 332 is fully protected from debris or chemical impact since this bellows is encapsulated inside the sliding cylinder 342 by the stem 334. The subassembly composed of the shaft 330, the seal 344, the lower bellows 332, the sliding cylinder 342, the stem 334, and the tungsten carbide (WC) ball 336 coupled thereto may then be inserted through the central adapter 314 and seal tightened with two nuts 346, for example, as shown in FIG. 5.

Volume 326 may then be filled with a non-compressible fluid (e.g., silicone oil) via port 328 in the central adapter 314, as depicted in FIG. 4A. All air may most likely be completely evacuated using a vacuum or any other suitable means, and plugs for ports 324 and 328 are installed.

A nitrogen charge is applied to the valve dome volume 320 (i.e., variable volume chamber). This dome pressure will partially compress upper bellows 316, as shown in FIG. 4A, such that the non-compressible fluid (e.g., silicone oil) will flow via volume 326 and duct 350 to the inside of the lower bellows 332, thereby expanding the lower bellows. With this expansion of the lower bellows 332, the stem 334 will move down, and the valve 300 will close by engaging the orifice 338 in the seating element 340 with the WC ball 336, as portrayed in FIG. 6A. This contact of the WC ball 336 actually functions as a mechanical stop for the upper bellows 316, where the mechanical stop prevents the upper bellows from over-compressing. At this point, the valve 300 is now in the closed position, and no injection gas can flow through the orifice 338 to the exit port 304.

When injection gas is applied through the entrance ports 302, the resulting pressure will at a certain point start compressing the lower bellows 332, and the non-compressible fluid (e.g., silicone oil) will flow from the lower bellows 332 to the upper bellows 316 via the duct 350 and the volume 326, thereby expanding the upper bellows and raising the piston 318, as illustrated in FIG. 4B. As the lower bellows 332 is compressed, the sliding cylinder 342, the stem 334, and the WC ball 336 move up and away from the orifice 338, thereby opening the valve 300, as depicted in FIG. 6B. At a certain high pressure, the lower bellows 332 will be fully compressed to solid and will be capable of withstanding extremely high injection pressures (e.g., of at least 10,000 psi or 11,000 psi) since the fully compressed lower bellows is now virtually a solid piece of metal. Once the lower bellows 332 is fully compressed, injection pressure will have no impact on the upper bellows 316.

A floating, constant volume is maintained inside the sliding cylinder 342. When the lower bellows 332 begins to compress due to the injection pressure, the non-compressible fluid will start displacing from the volume 352 to volume 354 created by movement of the sliding cylinder 342 along the shaft 330. The seal 344 slides along the shaft 330 creating this expanding volume 354 (and contracting volume 352), as illustrated in FIG. 6B. This floating constant volume feature is accomplished using the sliding cylinder 342 and the seal 344. Volumetric displacement during axial travel of the lower bellows 332 is exactly the same for volumes 352 and 354 per unit of the lower bellows' travel, either to compression or expansion. This is achieved by exact volumetric calculation and associated component design and is desired to obtain significantly increased bellows protection from internal or external pressure.

As an example of such component design, the outer diameter of the shaft 330 may be designed and fabricated such that as the lower bellows 332 is compressed and the non-compressible fluid is displaced, the volume expansion in volume 354 (between the OD of the shaft 330 and the ID of the sliding cylinder 342) is the same as the volume contraction in volume 352 (between the OD of the lower bellows 332 and the ID of the sliding cylinder 342). In other words, the outer diameter of the shaft 330 is harmonized with the inner diameter of the sliding cylinder 342 and the outer diameter of the lower bellows 332 in an effort to produce this equivalent volumetric displacement.

After application of the injection gas, the lower bellows 332 will be fully compressed to solid, which is desired to provide ultimate bellows protection from over-pressurizing and prevent deformation and failure of the lower bellows. As the lower bellows 332 is compressed, the non-compressible fluid contained inside the bellows system will travel from inside the lower bellows 332 to the inner diameter of the upper bellows 316, thereby expanding the upper bellows 316 and elevating the piston 318, as shown in FIG. 4B. As this occurs, the sliding cylinder 342, the stem 334, and the WC ball 336 move up and away from the orifice 338, as depicted in FIG. 6B. The valve 300 is now open for flow of injection fluid for artificial lift operations.

When the valve 300 is utilized for gas lift operations, the valve provides injection pressure amplification. In other words, since the upper bellows 316 is much larger than the lower bellows 332, in order to open the valve 300 for flow, a much higher injection pressure is involved due to the difference in cross-sectional area of the upper bellows 316 versus the outer diameter (OD) of the shaft 330.

The arrangement of the valve 300 described above is shown for gas lift applications. However, this seal arrangement utilizing two different bellows types and a floating constant volume fluid chamber may be used for other applications, such as gate valves shaft sealing, pumps shafts sealing, and the like.

Figure 7:
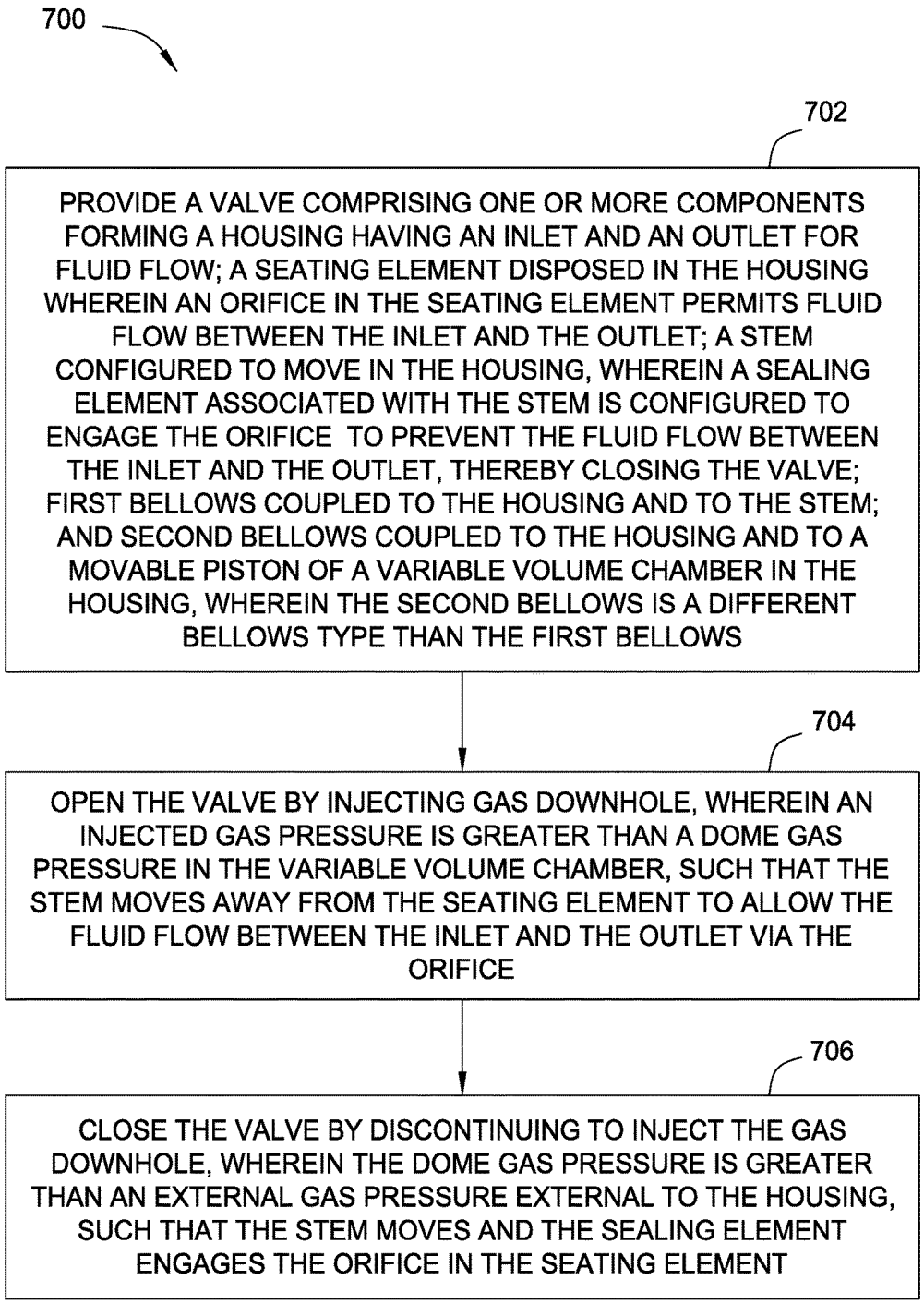
FIG. 7 is a flow diagram of example operations for performing downhole gas lift, in accordance with aspects of the present disclosure.

FIG. 7 is a flow diagram of example operations 700 for performing downhole gas lift, in accordance with embodiments of the present disclosure. The operations 700 may begin, at 702, by providing a valve. The valve generally includes one or more components forming a housing having an inlet and an outlet for fluid flow; a seating element disposed in the housing, wherein an orifice in the seating element permits fluid flow between the inlet and the outlet; a stem configured to move in the housing, wherein a sealing element associated with the stem is configured to engage the orifice to prevent the fluid flow between the inlet and the outlet, thereby closing the valve; a first bellows (e.g., lower bellows 332) coupled to the housing and to the stem; and a second bellows (e.g., upper bellows 316) coupled to the housing and to a movable piston of a variable volume chamber in the housing. The second bellows is a different bellows type than the first bellows. For example, the first bellows may be an edge-welded bellows, and the second bellows may be a standard convoluted bellows. For some embodiments, the sealing element is a tungsten carbide (WC) ball disposed at a tip of the stem.

At 704, the valve may be opened by injecting gas downhole. A pressure of the injected gas (i.e., an injected gas pressure) may be greater than a dome gas pressure in the variable volume chamber, such that the first bellows is compressed and the stem moves away from the seating element to allow the fluid flow between the inlet and the outlet via the orifice. Injecting the gas downhole at 704 fully compresses the first bellows to solid.

At 706, the operations 700 may further include closing the valve by discontinuing to inject the gas downhole. Without the injected gas, the dome gas pressure may be greater than an external gas pressure external to the housing, such that the stem moves and the sealing element engages the orifice in the seating element.

According to some embodiments of the present disclosure, the valve may include a shaft coupled to the housing at a first end of the shaft. The first bellows may be coupled to the stem and to a second end of the shaft, such that compression of the first bellows causes the stem to move towards the shaft and expansion of the first bellows causes the stem to move away from the shaft. The valve may also include a sliding cylinder containing the first bellows, coupled to the stem, and sealingly engaged to the second end of the shaft. For some embodiments, a first volume between an inner diameter of the sliding cylinder and an outer diameter of the first bellows is filled with a first non-compressible fluid. For some embodiments, axial travel of the sliding cylinder relative to the shaft causes equal volumetric displacement of the first non-compressible fluid between an upper portion (e.g., volume 354) of the first volume above the second end of the shaft and a lower portion (e.g., volume 352) of the first volume below the second end of the shaft. For some embodiments, a second volume formed by an inner diameter of the first bellows, an inner diameter of the second bellows, a duct of the shaft, and a hollow portion of the housing is filled with a second non-compressible fluid that is displaced as the first and second bellows are compressed or expanded. The first and/or the second non-compressible fluid may be silicone oil, for example.

CONCLUSION

Embodiments of the present disclosure provide a valve apparatus having two different bellows types and a floating constant volume fluid chamber in which one of the bellows travels. In this manner, the valve apparatus is capable of withstanding extremely high pressures (e.g., at least 10,000 psi).

While the foregoing is directed to embodiments of the present disclosure, other and further embodiments may be devised without departing from the basic scope thereof, and the scope thereof is determined by the claims that follow.

The invention claimed is:

1. A valve for controlling fluid flow between an inlet and an outlet, comprising:
   one or more components forming a housing for the valve;
   a bellows coupled to the housing;
   a stem configured to move in the housing;
   a shaft coupled to the housing, wherein the bellows is coupled to the stem and to the shaft, such that compression of the bellows causes the stem to move towards the shaft and expansion of the bellows causes the stem to move away from the shaft; and
   a sliding cylinder containing the bellows, coupled to the stem, and configured to move along the shaft.

2. The valve of claim 1, wherein the bellows comprises an edge-welded bellows.

3. The valve of claim 1, further comprising:
   a seating element disposed in the housing, wherein an orifice in the seating element permits the fluid flow between the inlet and the outlet and wherein a sealing element associated with the stem is configured to mate with the orifice to prevent the fluid flow between the inlet and the outlet, thereby closing the valve.

4. The valve of claim 3, wherein the bellows is coupled to the housing and to the stem.

5. The valve of claim 3, wherein the bellows is fully compressed to solid when the valve is open.

6. The valve of claim 3, wherein the sealing element comprises a tungsten carbide (WC) ball disposed at a tip of the stem.

7. The valve of claim 3, wherein:
the shaft is coupled to the housing at a first end of the shaft;
the bellows is coupled to the stem and to a second end of the shaft; and
the sliding cylinder containing the bellows, coupled to the stem, is sealingly engaged to the second end of the shaft.

8. The valve of claim 7, wherein a first volume between an inner diameter of the sliding cylinder and an outer diameter of the bellows is filled with a first non-compressible fluid.

9. The valve of claim 8, wherein the first non-compressible fluid comprises silicone oil.

10. The valve of claim 8, wherein axial travel of the sliding cylinder relative to the shaft causes equal volumetric displacement of the first non-compressible fluid between an upper portion of the first volume above the second end of the shaft and a lower portion of the first volume below the second end of the shaft.

11. The valve of claim 8, wherein a second volume formed at least in part by an inner diameter of the bellows, a duct of the shaft, and a hollow portion of the housing is filled with a second non-compressible fluid that is displaced as the bellows is compressed or expanded.

12. The valve of claim 3, further comprising another bellows coupled to the housing and to a movable piston of a variable volume chamber in the housing, wherein the other bellows is compressed when the valve is closed.

13. The valve of claim 1, wherein the valve is configured to operate in external pressures of at least 10,000 psi.

14. A method for performing downhole gas lift operations, comprising:
providing a valve, comprising:
one or more components forming a housing having an inlet and an outlet for fluid flow;
a seating element disposed in the housing, wherein an orifice in the seating element permits fluid flow between the inlet and the outlet;
a stem configured to move in the housing, wherein a sealing element associated with the stem is configured to engage the orifice to prevent the fluid flow between the inlet and the outlet, thereby closing the valve;
a bellows coupled to the housing and to the stem;
a shaft coupled to the housing, wherein the bellows is coupled to the stem and to the shaft, such that compression of the bellows causes the stem to move towards the shaft and expansion of the bellows causes the stem to move away from the shaft; and
a sliding cylinder containing the bellows, coupled to the stem, and configured to move along the shaft; and
opening the valve by injecting gas downhole, wherein an injected gas pressure is greater than a dome gas pressure in a variable volume chamber in the housing, such that the stem moves away from the seating element to allow the fluid flow between the inlet and the outlet via the orifice.

15. The method of claim 14, further comprising closing the valve by discontinuing to inject the gas downhole, wherein the dome gas pressure is greater than an external gas pressure external to the housing such that the stem moves and the sealing element engages the orifice in the seating element.

16. The method of claim 14, wherein injecting the gas downhole fully compresses the bellows to solid.

17. The method of claim 14, wherein:
the shaft is coupled to the housing at a first end of the shaft;
the bellows is coupled to the stem and to a second end of the shaft; and
the sliding cylinder containing the bellows, coupled to the stem, is sealingly engaged to the second end of the shaft.

18. The method of claim 17, wherein a first volume between an inner diameter of the sliding cylinder and an outer diameter of the bellows is filled with a first non-compressible fluid.

19. The method of claim 18, wherein axial travel of the sliding cylinder relative to the shaft causes equal volumetric displacement of the first non-compressible fluid between an upper portion of the first volume above the second end of the shaft and a lower portion of the first volume below the second end of the shaft.

20. The method of claim 18, wherein a second volume formed at least in part by an inner diameter of the bellows, a duct of the shaft, and a hollow portion of the housing is filled with a second non-compressible fluid that is displaced as the bellows is compressed or expanded.

* * * * *